United States Patent [19]
Dietrich et al.

[11] Patent Number: 5,548,518
[45] Date of Patent: Aug. 20, 1996

[54] ALLOCATION METHOD FOR GENERATING A PRODUCTION SCHEDULE

[75] Inventors: Brenda L. Dietrich, Yorktown Heights; Robert J. Wittrock, Ossining, both of N.Y.

[73] Assignee: International Business Machines Corporation, Armonk, N.Y.

[21] Appl. No.: 251,812

[22] Filed: May 31, 1994

[51] Int. Cl.⁶ .................................................. G06F 17/60
[52] U.S. Cl. .................... 364/468.06; 364/401 R
[58] Field of Search .................. 364/401–403, 364/468, 478

[56] References Cited

U.S. PATENT DOCUMENTS

| | | | |
|---|---|---|---|
| 4,459,663 | 7/1984 | Dye . | |
| 4,646,238 | 2/1987 | Carlson, Jr. et al. | 364/403 |
| 4,827,423 | 5/1989 | Beasley et al. | 364/468 |
| 4,887,207 | 12/1989 | Natarajan | 364/401 |
| 5,093,794 | 3/1992 | Howie et al. | 364/468 |
| 5,195,041 | 3/1993 | George et al. | 364/468 |
| 5,216,593 | 6/1993 | Dietrich et al. | 364/402 |
| 5,216,612 | 6/1993 | Cornett et al. | 364/468 |
| 5,229,948 | 7/1993 | Wei et al. | 364/468 |
| 5,235,508 | 8/1993 | Lirov et al. | 364/402 |
| 5,255,181 | 10/1993 | Chapman et al. | 364/401 |
| 5,280,425 | 1/1994 | Hogge | 364/402 |
| 5,283,745 | 2/1994 | Tanaka | 364/468 |
| 5,285,392 | 2/1994 | Kyle et al. | 364/468 |

OTHER PUBLICATIONS

L. E. Gregg et al "Priority Adjustment to Minimize Resource Conflicts Assisted by Horizontal Microcode", IBM Technical Disclosure Bulletin, vol. 32, No. 1, Jun. 1989, pp. 80–83.

*Primary Examiner*—Roy N. Envall, Jr.
*Assistant Examiner*—Steven R. Garland
*Attorney, Agent, or Firm*—Stephen C. Kaufman

[57] ABSTRACT

A novel allocation method for generating a feasible production schedule. The method, in response to a specified requirement q, comprises the steps of determining what quantity (r) of a product can be produced with a specified quantity of supply components; allocating a required quantity of supply components for filling a thus defined partial order; and filling a remainder of the requirement (q-r) at some later time.

12 Claims, 7 Drawing Sheets

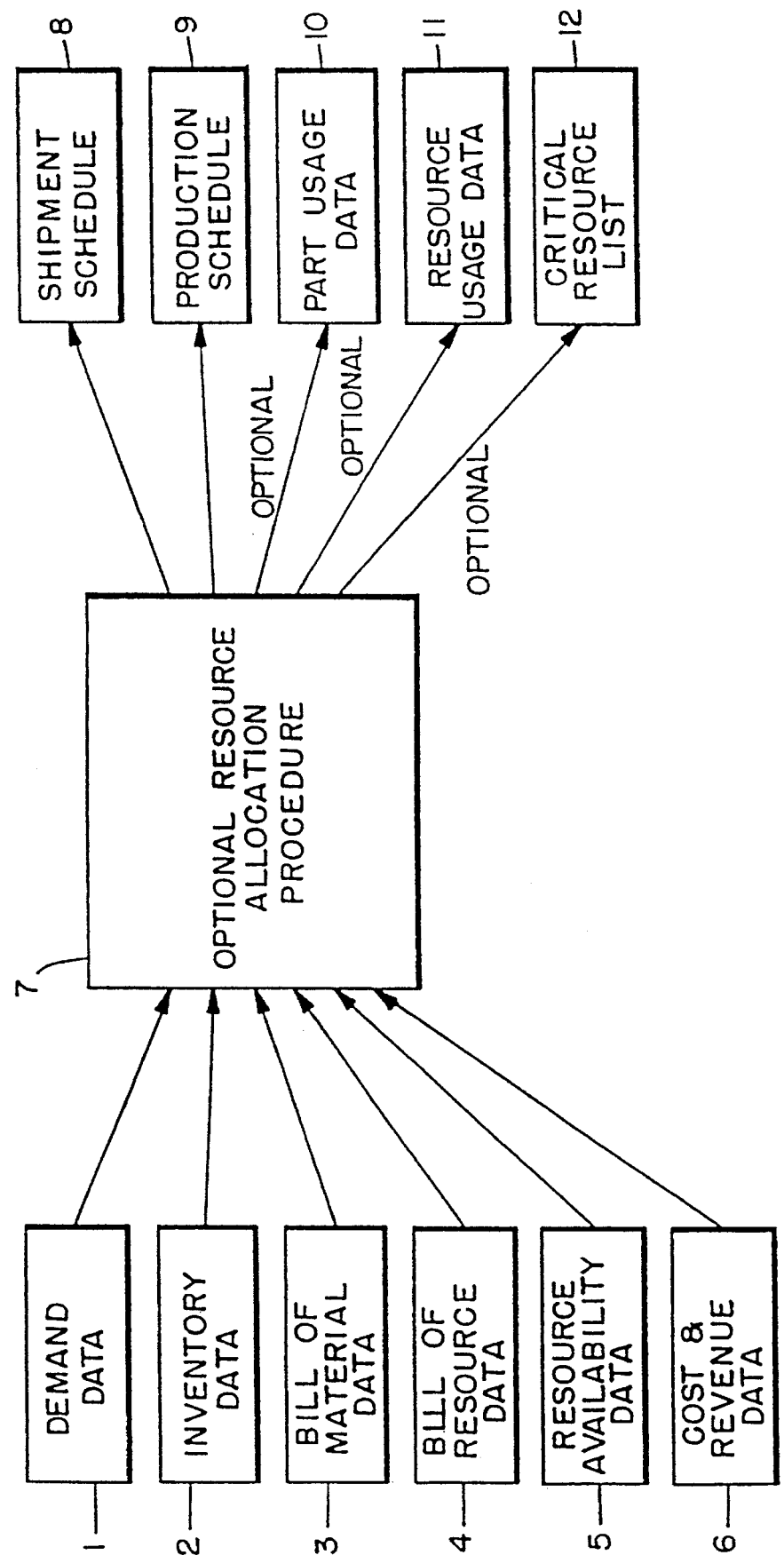

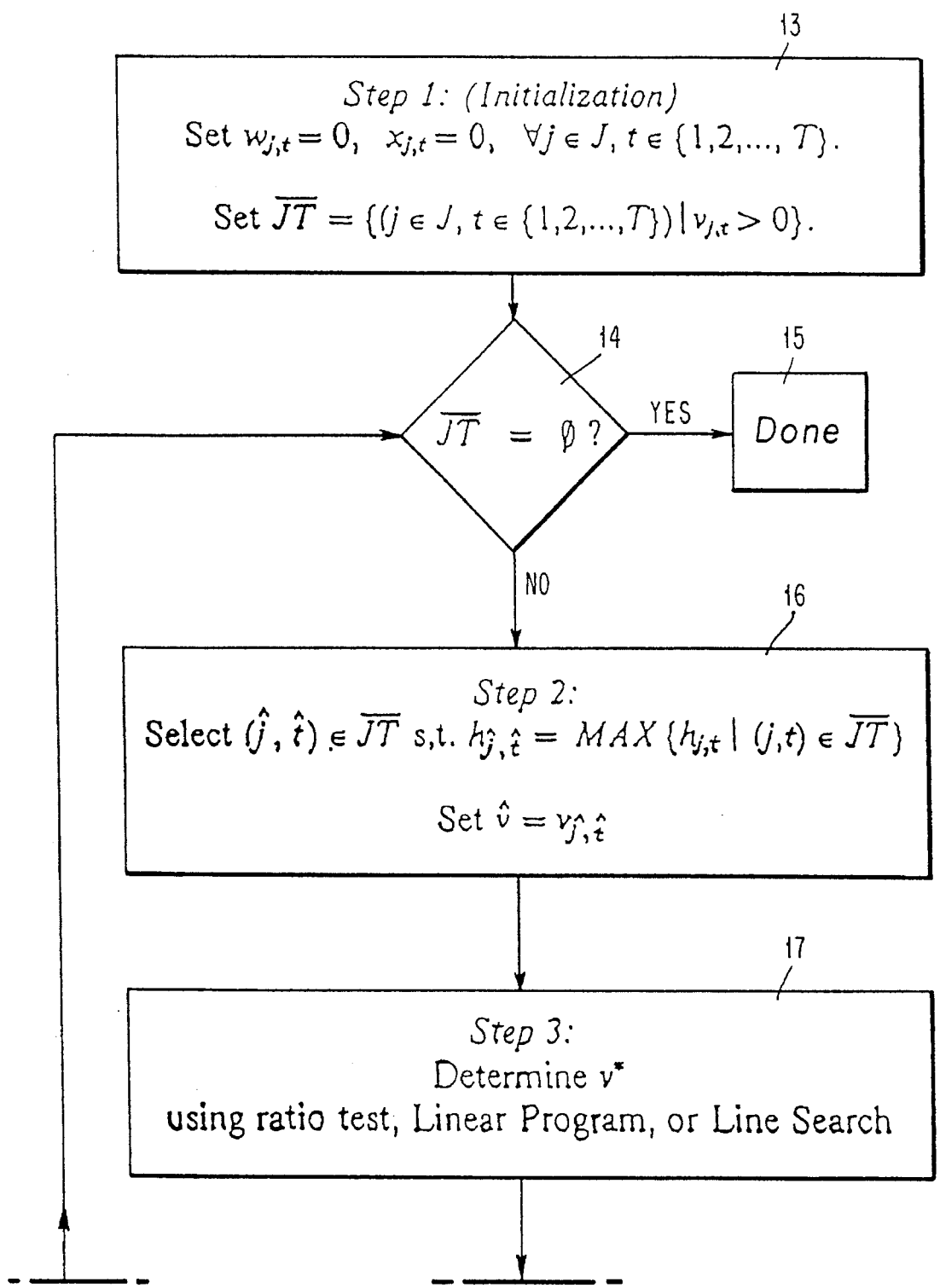

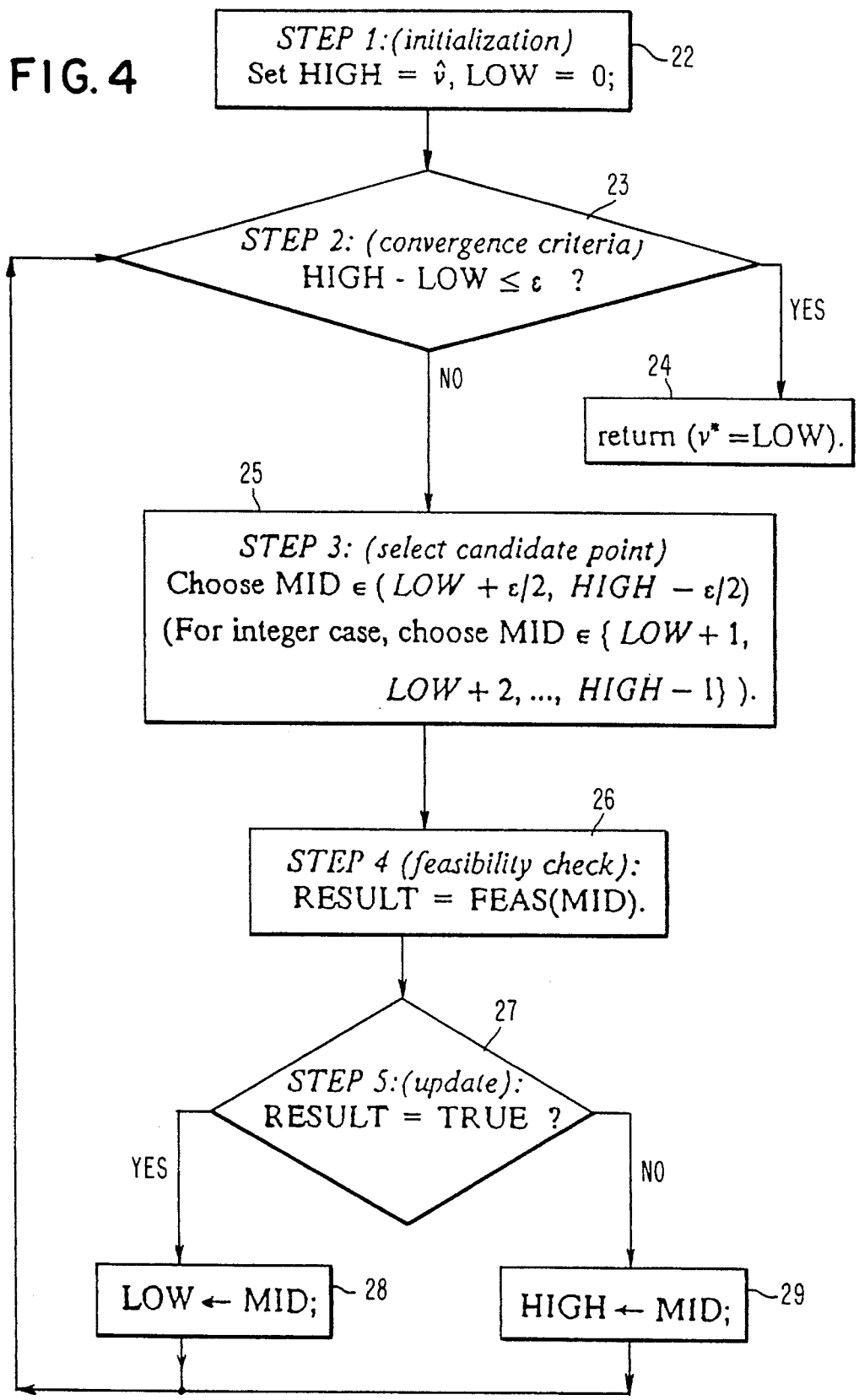
FIG. 4 SEARCH PROCEDURE:

BASIC DEMAND DRIVEN ALLOCATION ALGORITHM:

ALLOCATION METHOD FOR GENERATING A PRODUCTION SCHEDULE

BACKGROUND OF THE INVENTION

This invention relates to a novel allocation method for generating a production schedule.

INTRODUCTION TO THE INVENTION

Allocation methods for generating a production schedule are known, and are preferably used in conjunction with conventional Material Requirements Planning systems, for generating feasible master production schedules. FIGS. 1 and 2 (numerals 1 through 12) are illustrative of such systems. Allocation methods may also be used with detailed finite scheduling systems, for generating aggregate schedules that are feasible with respect to material availability and aggregate capacity constraints. Reference on these points is made, for example, in a copending and commonly assigned U.S. Ser. No 08/108 014 incorporated by reference herein.

SUMMARY OF THE INVENTION

We further reference the novel allocation method of the present invention by setting forth a conceptual backdrop and associated problem related to production planning.

Production planning is concerned with determining production and stock levels, in order to meet fluctuating demand requirements.

An optimal or ideal production schedule may comprise producing end products according to a demand schedule, and producing subassemblies (i.e., intermediate products) exactly when needed as input to a next assembly process. However, this optimal production schedule assumes conditionalities e.g., that raw materials can be acquired as needed, and that plant capacity can be made infinitely expandable and contractible, at no cost.

Notwithstanding a theoretical desirability for such an optimal production schedule, we point out that, in many real assembly systems, a supply of some raw material or machine capacity may be tightly constrained, with long production and/or procurement lead times. Moreover, a demand for product may fluctuate, both in total volume and in product mix. As a result, the aforementioned conditionalities may not be met so that just-in-time production may not therefore be feasible—it typically is not feasible-and when feasible, may result in a problem of poor utilization of resources.

This situation and its included problem suggest to us a need for a method suitable for determining a feasible utilization of available resources, given a current forecast of demand requirements.

In response and satisfaction of this need, we have now discovered a novel allocation method for generating a feasible production schedule. The method, in response to a specified requirement q, comprises the steps of:

(1) determining what quantity (r) of a product can be produced with a specified quantity of supply components;

(2) allocating a required quantity of supply components for filling a thus defined partial order; and (3) filling a remainder of the requirement (q-r) at some later time.

In another aspect of the present invention, we now disclose an apparatus for generating a feasible production schedule in response to a specified requirement q, the apparatus comprising:

(1) means for determining what quantity (r) of a product can be produced with a specified quantity of supply components;

(2) means for allocating a required quantity of supply components for filling a thus defined partial order; and (3) means for filling a remainder of the requirement (q-r) at some later time.

The novel method and apparatus as defined can realize several significant advantages.

First of all, the novel method and apparatus can directly address and solve an important problem related to production planning. For a complex case where there may be, for example, (1) an insufficient inventory of one or more supply components; and/or (2) possibly a lack of a requisite number of one or more supply resources needed to accomplish a production run; and/or (3) inventory constraints which can restrict a manufacturing process such that only a fraction of a desired number of various end products can be produced; then, for any of these fact patterns, a thus prompted decision that a manufacturer has to make with respect to allocation of the available materials and resources to provide an optimum (feasible) number of each end product, can be realized, per the novel method and apparatus, in accordance with an objective function. Restated, the present invention eschews heuristic or ad hoc procedures, in favor of methodology for definitely establishing, in a mathematical sense, a necessary amount of each of the end products to be produced to meet an objective function in the presence of inventory constraints.

BRIEF DESCRIPTION OF THE DRAWINGS

The invention is illustrated in the accompanying drawing, in which

FIG. 2 comprises a schematic showing a flow of data for the FIG. 1 diagram;

FIG. 4 comprises a preferred Search Procedure that may be used in conjunction with a step recited in FIG. 3.

DETAILED DESCRIPTION OF THE INVENTION

Introduction

Figure 1:
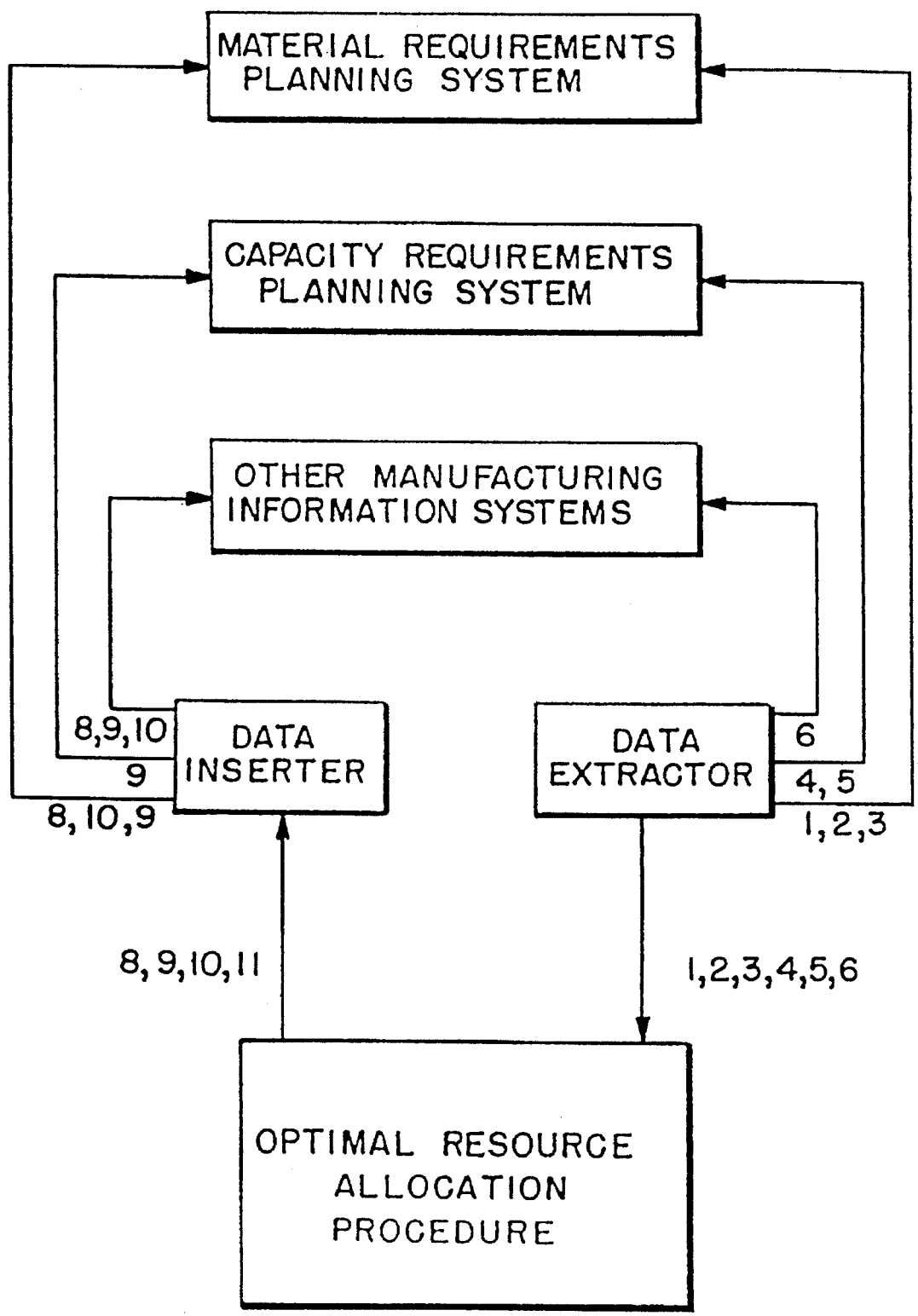
FIG. 1 comprises a block diagram for providing constrained material requirements planning.

The novel method of the present invention, as summarized as genus above, can produce a feasible production schedule that is "optimal" with respect to production priorities specified for part number (P/N) information. The novel method, as species, comprises an extension of the genus for producing both a feasible production schedule and a feasible shipment schedule that is optimal with respect to shipment priorities specified for the demands. The novel method, as species, also subsumes modifications that can advantageously be used to solve specific resource allocation problems. We now turn our attention to particulars in illustration of the genus and species.

Assumptions/Inputs/Notation

We assume that a planning horizon can be partitioned into T planning periods. We denote the periods by t=1,2, ..., T. These planning periods can be shifts, days, weeks, months, quarters or even years. It is not necessary that the planning periods be of equal length.

Inputs:

Capacity information comprising a list of the capacity resources that will be considered, and the amount of each capacity resource that is available in each period. Part number (P/N) information consisting of a list of the P/Ns that will be considered, and for each P/N, whether it is a product (can be built) or a raw material (cannot be built, has external availability only).

For each P/N, supply data, comprising an amount of that P/N that becomes available from external sources in each time period. For each product, production information comprising:

a list of periods during which the P/N can be completed.
  bill-of-material (BOM) information comprising a list of entries of the following form: product completion period, P/N consumed, consumption period, usage quantity, bill-of-resource (BOR) information comprising a list of entries of the following form: product completion period, capacity resource consumed, consumption periods, usage quantity.

For each P/N, requirements data comprising an amount of that P/N that is requested for external consumption in each time period.

Note that the BOM and BOR data described above incorporates the usual notion of BOM "effectivity" dates used for representing engineering changes, and permits, but is not restricted to instances with multiple occurrences of the same "consumed" part (or capacity) on a product's BOM (or BOR), as might occur when a part (capacity) is used more than once during the production of a product. We say that a P/N is a subassembly if it is a product (has a BOM) and is a consumed P/N on some other products BOM. We call a product an "end product" if it is not consumed on any other product's BOM. The requirements quantity does not include "internal" requirements, such as the quantity of a subassembly required to produce the external requirements for a final assembly.

Assumptions

Unused MATERIAL remains available for use in the next period. Unused RESOURCES are not available in later periods.

Notation

J=set of part-numbers,
  $e_{j,t}$=external supply of j in period t (for t=1 the quantity $e_{j,1}$ includes initial stock of P/N j),
  $a_{i,j,t,\tau}$=quantity of P/N i required in period t to produce one unit of P/N j in period $\tau$.
  $v_{j,t}$=external requirements for product j in period t.
  $h_{j,t}$=priority of P/N j in period t.
  R = set of resources,
  $g_{r,j,t,\tau}$=quantity of resource r required in period t to produce one unit of P/N j in period $\tau$,
  $c_{r,t}$=quantity of resource r available in period t.

Product yield and component fallout or product re-work ratios can be incorporated into the usage quantities $a_{i,j,t,\tau}$ and $g_{r,j,t,\tau}$. We require that the BOR coefficients $g_{r,j,t,\tau}$ be non-negative, however, for consistency with many existing Manufacturing Resource Planning MRP software systems, we do permit, but do not restrict our invention to, instances that include BOM coefficients $a_{i,j,t,\tau}$ with negative values. A primary output of the basic allocation method is a feasible production schedule that is optimal with respect to the priorities $h_{j,t}$. We use the following notation:

$x_{j,t}$=quantity of P/N j produced in period $t \in \{1,2,\ldots,T\}$.

We let X denote the matrix of production values $x_{j,t}$. Some of the production of a P/N j may be used to satisfy internal requirements, for example, requirements for a subassembly to be used in a final assembly. Some of the production of P/N j, and possibly some of the external supply of P/N j will be made available to satisfy the the external requirements for P/N j. We let W denote the matrix of external availability values. Specifically, $w_{j,t}$ is the quantity of P/N j that is used in period t to satisfy external requirements for P/N j. We call the pair (W, X) a solution to the resource allocation problem. Preferably, we say that a pair (W, X) is feasible with respect to the availability data $e_{j,t}$ and $c_{r,t}$ if the following inequalities hold:

$$\left\{ \sum_{t \leq t'} w_{i,t} + \sum_{t \leq t'} \sum_{j \in J} \sum_{\tau} a_{i,j,t,\tau} x_{j,\tau} \leq \sum_{t \leq t'} e_{i,t} + \sum_{t \leq t'} x_{i,t} \;\; t' \in \{1,2,\ldots,T\}, i \in J \right. \quad (1)$$

$$\left\{ \sum_{j \in J} \sum_{\tau} g_{r,j,t,\tau} x_{j,\tau} \leq c_{r,t} \;\; t \in \{1,2,\ldots,T\}, r \in R. \right. \quad (2)$$

The first inequality is called the material balance constraint (MBC), and the second inequality is called the capacity availability constraint (CAC).

To understand the material balance constraints (MBC), note that the first term on the left-hand side is the quantity of P/N i that has been used for external requirements for i through period t', and the second term is the total usage of P/N i in the production of other P/Ns (or, in the case of negative usage, the net amount of P/N i consumed or produced through the production of other P/Ns) through period t'. On the right-hand side of the material balance constraints, the first term is the total external availability of P/N i through period t' and the second term is the total production of of P/N i through period t'.

The capacity availability constraint (CAC) is somewhat simpler. The left-hand side gives the total quantity of resource r used in period t while the right-hand side gives the availability of resource r in period t.

The solution produced by our methods is feasible with respect to material and capacity availability, however no lotsizing or minimum order quantity rules are considered when generating the solution.

If there is sufficient material and capacity available to meet all the requirements through "just-in-time" production, then the external availability schedule will exactly correspond to the requirements. If there is not sufficient capacity or material available to meet all requirements, then the solution will allocate the available resources in favor of P/Ns with higher priority. The basic allocation algorithm considers P/N, period pairs (j,t) in order of priority $h_{j,t}$. It allocates available resources and materials to each of the requirements $v_{j,t}$ until either the entire requirements quantity is satisfied or the availability of some material or resource is exhausted.

Figure 3B:
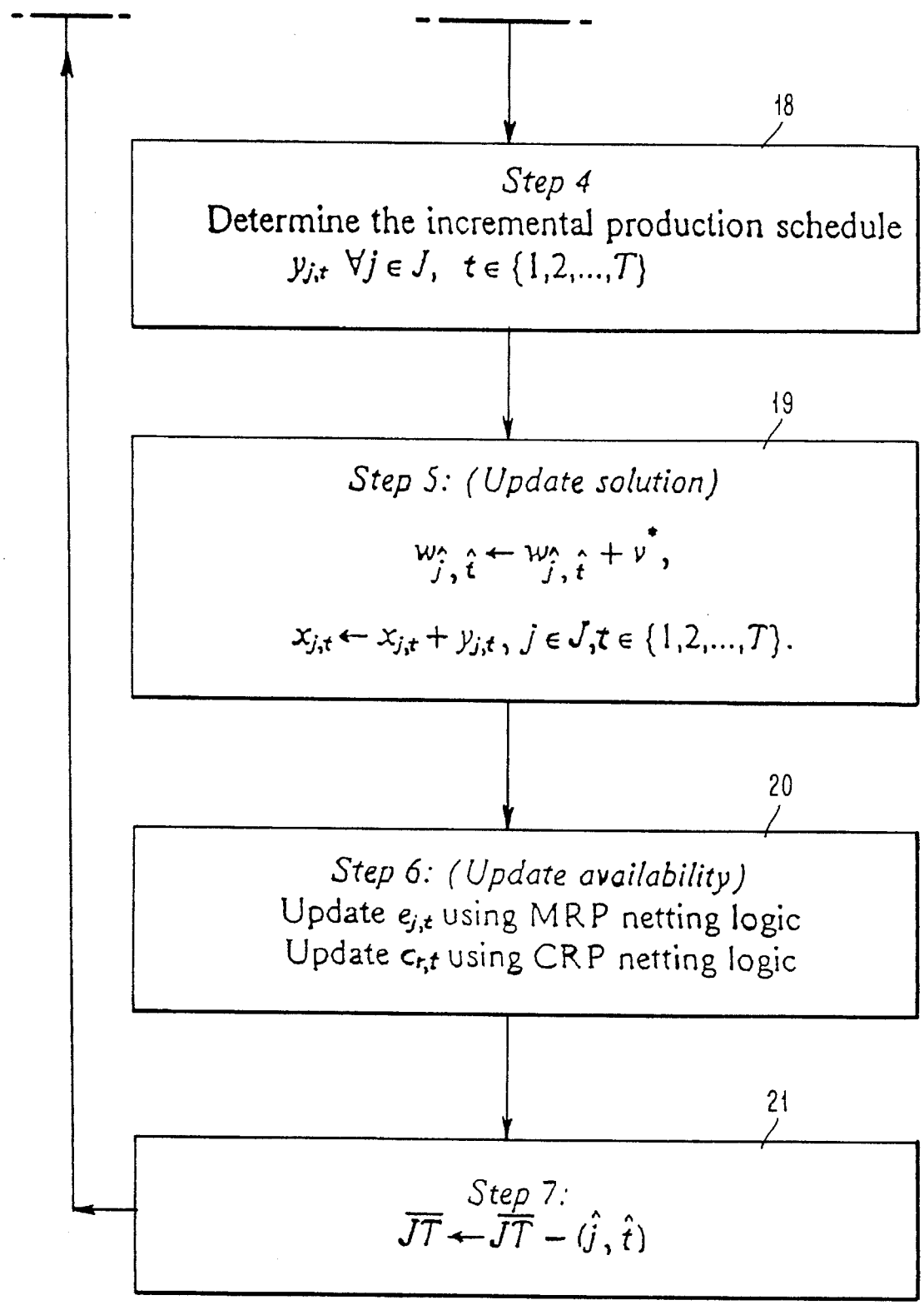
FIG. 3 comprises a Basic Allocation Algorithm that is preferably used in realization of one mode of the present invention.

Attention is now directed to FIG. 3 (numerals 13 through 21), which sets forth a preferred Basic Allocation Algorithm in accordance with equations (1) and (2), and to the following preferred details of the Basic Allocation Algorithm.

BASIC ALLOCATION ALGORITHM

Step 1: Set $w_{j,t}$=0 and $x_{j,t}$=0 for all $j \in J$ and $t \in \{1,2,\ldots,T\}$. Set $\overline{JT}=\{(j \in J, t \in \{1,2,\ldots,T\}|v_{j,t}>0\}$. Do while $\overline{JT} \neq \emptyset$.

Step 2: Select the pair $(\hat{j}, \hat{t}) \in \overline{JT}$ having the highest priority. Break ties arbitrarily. Set $\hat{v}=v_{\hat{j},\hat{t}}$.

Step 3: Determine $v^*$ as the minimum of: the requirement quantity $\hat{v}$, and the maximum quantity of P/N $\hat{j}$ that can be made available for external requirements in period $\hat{t}$ subject to the availability of material and capacity.

Step 4: Determine the production schedule $Y_{j,t}$ for all $j \in J$ and $t \in \{1,2,\ldots,T\}$ necessary to support the external availability of $v^*$ units of P/N $\hat{j}$ in period $\hat{t}$.

Step 5: Update the solution $$w_{j,t} \leftarrow w_{j,t} + v^*,$$

$$x_{j,t} \leftarrow x_{j,t} + y_{j,t} \text{ all } j \in J \text{ and } t \in \{1,2,\ldots,T\}.$$

Step 6: Update material availability $e_{j,t}$ according to standard materials requirement planning netting logic. Update capacity availability $c_{r,t}$ according to standard capacity requirements planning logic.

Step 7: Update the set $\overline{JT}$: $\overline{JT} \leftarrow \overline{JT} - (\hat{j}, \hat{t})$.

Step 1, Step 2, Step 5, and Step 7 of the basic algorithm require no further explanation. Step 6 requires simple netting logic, similar to that used in MRP and CRP.

For each resource $r \in R$ update $c_{r,t}$ as follows:

$$c_{r,t} \leftarrow c_{r,t} - \sum_{j \in J} \sum_{\tau} g_{r,j,t,\tau} y_{j,\tau}.$$

For each P/N $i \in J$ and each period $t \in \{1,2,\ldots,T\}$ we first increase $e_{i,t}$ by the production quantity $y_{i,t}$.

$$e_{i,t} \leftarrow e_{i,t} + y_{i,t}.$$

Then, for each $i \in J$ and $t \in \{1,2,\ldots,T\}$ compute $z_{i,t}$, the amount of $i$ consumed in period $t$.

$$z_{i,t} = \begin{cases} v^* & \text{if } i = \hat{j} \text{ and } t = \hat{t} \\ \sum_{j \in J} \sum_{\tau} a_{i,j,t,\tau} y_{j,\tau} & \text{otherwise.} \end{cases}$$

Then for each $i \in J$ and $t \in \{1,2,\ldots T\}$ net the usage against the updated availability, using the latest possible supply:

Set $t'=t$.
While $t'>0$ $$\delta = \text{MIN } \{z_{i,t}, e_{i,t'}\},$$

$$z_{i,t} \leftarrow z_{i,t} - \delta,$$

$$e_{i,t'} \leftarrow e_{i,t'} - \delta,$$

$$t' \leftarrow t' - 1.$$

Step 3 can be implemented in a number of different ways. For example, the problem of determining the maximum amount $v^*$ of product $\hat{j}$ that can be produced in period $\hat{t}$ can be formulated as a linear program. This formulation also yields the production variables used in Step 4. Let $\hat{J}$ be the set of P/Ns that are involved in the production of P/N $\hat{j}$. That is, $\hat{j} \in \hat{J}$, and for each $i \in J$, we have $i \in \hat{J}$ if and only if there exists a P/N $j \in \hat{J}$ and a pair of time periods $t, \tau \in \{1,2,\ldots,T\}$ such that $a_{i,j,t,\tau} \neq 0$. Let $\hat{R} \subset R$ be the set of capacity resources that are involved in the production of the P/Ns in $\hat{J}$. That is, $\hat{R} = \{r \in R | g_{r,j,t,\tau} \neq 0 \text{ some } j \in \hat{J}, t, \tau \in \{1,2,\ldots,T\}\}$. Note that for most production planning problems, even if the sets $J$ and $R$ are quite large, for any choice of $\hat{j} \in J$, the sets $\hat{J}$ and $\hat{R}$ will be relatively small. Recall that $y_{j,t}$ is the quantity of P/N $j \in \hat{J}$ produced in period $t \leq \hat{t}$, and let $u_{j,t}$ be the inventory of P/N $j \in \hat{J}$ held at the end of period $t \leq \hat{t}$. A preferred linear program (LP) for computing $v^*$ and $y_{j,t}$ is as follows:

MAX $v^*$
s.t. $v^* \leq \hat{v}$ $$v^* \leq \hat{e}_{\hat{j},\hat{t}} + y_{\hat{j},\hat{t}}$$

$$\sum_{j \in \hat{J}} \sum_{\tau} a_{i,j,1,\tau} y_{j,\tau} + u_{i,1} = e_{i,1} + y_{i,1} \quad \forall i \in \hat{J}$$

$$\sum_{j \in \hat{J}} \sum_{\tau} a_{i,j,t,\tau} y_{j,\tau} + u_{i,t} = e_{i,t} + u_{i,t-1} + y_{i,t} \quad \forall i \in \hat{J}, t = 2,\ldots,\hat{t}$$

$$\sum_{j \in \hat{J}} g_{r,j,t,\tau} y_{j,\tau} \leq c_{r,t} \quad \forall r \in \hat{R}, t = 1,2,\ldots,\hat{t}$$

$$y_{i,t} \geq 0, u_{i,t} \geq 0 \quad \forall i \in \hat{J}, \forall t \leq \hat{t}$$

This LP will in general be relatively small and fast to solve. If one adds a small "penalty" for over-building to the objective function, then the values of $y_{i,j}$ corresponding to the optimal solution $v^*$ will provide the non-zero entries for the production schedule called for in Step 4. This penalty function takes the form of small, positive coefficients on the variables $u_{j,t}$. In addition, the dual variables associated with the material balance and resource availability constraints can be used to determine which of the materials and resources play the greatest role in limiting the availability of P/N $\hat{j}$ in period $\hat{t}$.

In the case of "single level production," with no negative usage rates, Step 3 can be implemented as a simple ratio test. By single level production we mean that there are no subassemblies; every P/N is either a raw material or an end product. Step 3 and Step 4 can be implemented as follows:

For each $i \in J$ and each $t \in \{1,2,\ldots,T\}$ such that $a_{i,\hat{j},t,\hat{t}} > 0$ compute $$\mu_{i,t}^J = \frac{\sum_{\tau \leq t} e_{i,\tau}}{\sum_{\tau \leq t} \hat{v} a_{i,\hat{j},\tau,\hat{t}}}.$$

For each $r \in R$ and each $t \in \{1,2,\ldots,T\}$ such that $g_{r,\hat{j},t,\hat{t}} > 0$ compute $$\mu_{r,t}^R = \frac{c_{r,t}}{\hat{v} g_{r,\hat{j},t,\hat{t}}}.$$

Compute:

$$\mu^J = \text{MIN } \{\mu_{i,t}^J \mid a_{i,\hat{j},t,\hat{t}} > 0\},$$

$$\mu^R = \text{MIN } \{\mu_{r,t}^R \mid g_{r,\hat{j},t,\hat{t}} > 0\},$$

$$\mu = \text{MIN } \{\mu^R, \mu^J\}.$$

Set $v^* = \min \left\{ \hat{v}, \mu\hat{v} + \sum_{\tau \leq \hat{t}} e_{\hat{j},\tau} \right\}$.

If external requirements are restricted to integer values, round $v^*$ down to the nearest integer. Set $$y_{j,t} = \begin{cases} v^* - \sum_{\tau \leq t} e_{j,\tau} & \text{if } j = \hat{j} \text{ and } t = \hat{t} \\ 0 & \text{otherwise.} \end{cases}$$

Note that the set of P/Ns limiting the availability of P/N $\hat{j}$ in period $\hat{t}$ is given by $\{j \in J | \mu = \mu_{j,t}^J \text{ for some } t\}$ and the set of resource limiting the availability of P/N $\hat{j}$ is given by $\{r \in R | \mu = \mu_{r,t}^R \text{ for some } t\}$.

Step 3 can also be implemented as a simple line search on the interval $[0,\hat{v}]$, or, if all quantities must be integer, as a search on the set of integer values $\{0,1,2,\ldots,\hat{v}\}$. A simple binary search, which uses MRP and CRP explosion and netting to check the feasibility of candidate quantity v works reasonably well for moderately sized problems.

A "feasibility checker" called FEAS preferably evaluates whether there is sufficient material and capacity to meet a given external availability level level v, and is used throughout the search. The program FEAS is passed the adjusted supply and resource data, and the target quantity v. FEAS returns a value of "TRUE" if the quantity v is feasible, and returns a value of "FALSE" is v is not feasible. An actual MRP and/or CRP tool could be used for this purpose, or the standard MRP and CRP explosion and netting logic can be simplified and re-implemented for use in the search. After completing the explosion and netting process, the target shipment quantity v is declared feasible if no material or capacity shortages are reported, and is declared infeasible if any P/N or resource is flagged as short. If the entire quantity $\hat{v}$ is feasible, then Step 3 should produce $v^*=\hat{v}$. This can be ensured by a single call to the program FEAS with the target quantity set to $\hat{v}$. If the value "TRUE" is returned, no search is required.

For any linear search method, one first selects a tolerance level $\epsilon>0$. For the integer case, one should choose $\epsilon=1$. Note that the value $v=0$ requires no materials and no resources, and thus is always a feasible point. As described above, we assume that the search procedure is invoked only if the quantity $\hat{v}$ is infeasible.

Attention is now directed to FIG. 4 (numerals 22 through 29) which sets forth a preferred Search Procedure, and to the following preferred details of the Search Procedure.

SEARCH PROCEDURE

STEP 1 (initialization): Set HIGH=$\hat{v}$, LOW=0;

STEP 2 (convergence criteria): If HIGH—LOW$\leq \epsilon$ then return ($v^*$=LOW).

STEP 3 (select candidate point): Choose MID $\epsilon$ (LOW+$\epsilon$/2, HIGH–$\epsilon$/2) (For integer case, choose MID $\epsilon$ {LOW+1, LOW+2, ... , HIGH–1}).

STEP 4 (feasibility check): RESULT=FEAS(MID).

STEP 5 (update): If RESULT=TRUE then LOW$\leftarrow$MID; if RESULT=FALSE then HIGH$\leftarrow$MID. Go To STEP 2.

For a binary search, the choice of MID is given by MID=(HIGH+LOW)/2 (rounded in the integer case). Other methods of selecting the candidate point can also be used.

Feasibility checking can be done through use of actual MRP and CRP tools, or though through MRP and CRP emulation. An example implementation (without lot-sizing) of MRP and CRP emulation will be described soon, but first some additional notation is required. Assume that the P/Ns, which are alphanumeric strings, are mapped to the integers {1,2,...,|J|} in a manner such that if there exist time periods t, $\tau 0 \in \{1,2,...,T\}$ such that with $a_{i,j,t,\tau} \neq 0$, then i>j. Let $f_{j,t}$ denote the internal (or dependent) demand for P/N j $\in$ J in period t $\in$ {1,2, ... T}. These quantities are generated throughout the MRP process. As mentioned in the description of the input data, for each P/N j there is a list of periods $T_j$ in which P/N j can be produced. The following procedure also determines the production variables $y_{j,t}$ required in STEP 4. The variables $\tilde{e}_{j,t}$ and $\tilde{c}_{r,t}$ are temporary copies of the supply and capacity data.

FEAS PROCEDURE

Input: v
Output: "TRUE" or "FALSE"

Step 1 (initialization): Set $f_{j,t}=0$ for all j $\in$ J, t $\in$ {1,2, ... , T}. Set $y_{j,t}=0$ for all j $\in$ J, t $\in$ {1,2, ... , T}. Set $\tilde{e}_{j,t}$ all j $\in$ J, t $\in$ {1,2, ... , T}. Set $\tilde{c}_{r,t}=c_{r,t}$ all j $\in$ J, t $\in$ {1,2, ... , T}. Set $f_{\hat{j},t}=v$.

Step 2 (loop): For j=1 to |J|:
For $\tau$=1 to T: (Netting) Set t=$\tau$. While $f_{j,\tau}>0$ and t>0; $\delta \leftarrow$ MIN $\{\tilde{e}_{j,t}, f_{j,\tau}\}$, $f_{j,\tau} \leftarrow f_{j,\tau}-\delta$, $\tilde{e}_{j,t} \leftarrow \tilde{e}_{j,t}-\delta$, t$\leftarrow$t–1.
(Exploding) If $f_{j,\tau}>0$ and $\tau \in T_j$ then do: Set $y_{j,\tau}=f_{j,\tau}$.
(MRP) For every i $\in$ J and t $\in$ {1,2, ... ,T} such that $a_{i,j,t,\tau} \neq 0$ do: if $a_{i,j,t,\tau}>0$ update internal demand $f_{i,t} \leftarrow f_{i,t}+a_{i,j,t,\tau}f_{j,\tau}$, if $a_{i,j,t,\tau}>0$ update temporary supply $\tilde{e}_{i,t} \leftarrow \tilde{e}_{i,t}-a_{i,j,t,\tau}f_{j,\tau}$.
(CRP) For every r $\in$ R and t $\in$ {1,2, ... ,T} such that $g_{i,j,t,\tau}>0$ do: update $\tilde{c}_{r,t} \leftarrow \tilde{c}_{r,t}-g_{r,j,t,\tau}f_{j,\tau}$. $f_{j,\tau}=0$.

Step 3: If there exists j $\in$ J and t $\in$ {1,2, ... ,T} such that $f_{j,t}>0$ or there exists r $\in$ R and t $\in$ {1,2, ... ,T} such that $\tilde{c}_{r,t}<0$ then return ("FALSE"); otherwise return ("TRUE").

Note that executing the same explosion and netting logic on the value $v^*$ with the real supply and capacity data $e_{j,t}$ and $c_{r,t}$ will provide the updating required for STEP 6 of the basic allocation method.

This method can also be used to determine the list of materials and resources that play the most significant role in limiting availability of P/N j. If $v^*<\hat{v}$, then additional material or resources are required to meet the original requirements. To determine exactly which parts and resources are required to increase the availability quantity, one can execute the FEAS procedure with the test value $v=v^*+\epsilon$. In order to increase the maximum availability value by $\epsilon$, one must increase the availability of every part j $\in$ J and every resource r $\in$ R that has $e_{j,t}<0$ or $c_{r,t}<0$, respectively, for this test value $v^*+\epsilon$.

The Demand Driven Basic Allocation Method

In many manufacturing enterprises, the demand for P/Ns is not expressed simply as total per period requirements for each product, but instead as specific demand streams. For example, a demand stream may correspond to a specific order placed by a specific customer; it may correspond to the requirements for P/Ns that are sold through a specific distribution channel; it may correspond to the expected sales for a particular marketing promotion; or it may correspond to a forecast of demand for the P/N. We require the following additional notation and problem data:

D=set of demands, $p_d \in$ J, P/N for demand d $\in$ D, $v_d$=quantity of demand d $\in$ D, $q_d \in \{1,2,...,T\}$, the due date of demand d $\in$ D, $h_d$=priority of demand d $\in$ D.

As in the previous section, we let X denote the matrix of production values. We now let $s_{d,t}$ be the shipment for demand d $\in$ D in period t $\in$ {1,2, ... ,T} and let S denote the matrix of shipments values $s_{d,t}$. We say that the pair (X,S) is feasible if the resource availability constraint is satisfied, and the following shipment material balance constraint (SMBC) is satisfied.

$$\sum_{t \leq t'} \sum_{d \in D, P_d=i} s_{d,t} + \sum_{t \leq t'} \sum_{j \in J} \sum_{\tau} a_{i,j,t,\tau}x_{j,\tau} \leq \sum_{t \leq t'} e_{i,t} +$$

$$\sum_{t \leq t'} x_{i,t} \; t' \in \{1,2,...,T\}, i \in J$$

We make the following simplifying assumptions:
early shipment is not allowed,
late shipment is not allowed, over shipment is not allowed,
partial shipment is allowed.

Later we will show how the demand driven basic allocation method can be modified to relax the first two assumptions. Note that the first two assumptions imply that the shipment variable $s_{d,t}$ will be equal to zero unless the shipment period t is equal to the demand due date $q_d$. The third assumption implies that the amount shipped in the demand period, $s_{d,qd}$ is less than or equal to the demand quantity $v_d$.

Recall that each demand $d \in D$ is a 4-tuple of P/N, quantity, due-date, and priority: $d=(p_d, v_d, q_d, h_d)$.

The basic allocation algorithm can be modified to consider the individual demand, and produce an optimal, feasible shipment schedule and production schedule, as follows and with attention to FIG. 5 (numerals 30 through 39).

BASIC DEMAND DRIVEN ALLOCATION ALGORITHM

Step 1: Set $s_{d,t}=0$ for all $d \in D$ and $t \in \{1,2,\ldots,T\}$. Set $x_{j,t}=0$ for all $j \in J$ and $t \in \{1,2,\ldots,T\}$.
Do while $D \neq 0$.

Step 2: Select the demand $\hat{d} \in D$ having the highest priority. Break ties arbitrarily. Set $$\hat{j}=p_{\hat{d}},$$

$$\hat{t}=q_{\hat{d}},$$

$$\hat{v}=v_{\hat{d}}.$$

Step 3: Determine $v^*$ as the minimum of t the demand quantity $\hat{v}$, and the maximum quantity of P/N $\hat{j}$ that can be completed in period $\hat{t}$ subject to the availability of material and capacity.

Step 4: Determine the production schedule $y_{j,t}$ for all $j \in J$ and $t \in \{1,2,\ldots,T\}$ necessary to support the shipment of $v^*$ units of P/N $\hat{j}$ in period $\hat{t}$.

Step 5: Update solution $$s_{\hat{d},\hat{t}} \leftarrow s_{\hat{d},\hat{t}}+v^*$$

$$x_{j,t} \leftarrow x_{j,t}+y_{j,t} \text{ all } j \in J \text{ and } t \in \{1,2,\ldots,T\}.$$

Step 6: Update material availability $e_{j,t}$ according to standard materials requirement planning netting logic. Update capacity availability $c_{r,t}$ according to standard capacity requirements planning logic.

Step 7: Update the demand set $D \leftarrow D-\hat{d}$.
Steps 1, 2, 5, and 7 require no further explanation. Steps 3, 4, and 6 are executed using the same logic that has been described in detail for the basic allocation algorithm.

Extensions to Basic Demand Driven Method

The above basic allocation model assumes that demand can only be served in the period in which it is due. In many real manufacturing problems, demand can be backlogged, and met in a later period. Some portion of the unmet demand may be lost, but the remainder is transferred to the following period. The basic algorithm can be modified to address backlogging by revising the demand $\hat{d}$ instead of deleting it from D whenever $v^*<\hat{v}$.

For each demand $d \in D$ we let $\gamma_d:R \rightarrow R$ be a function that specifies the carry-over in to period $q_d+1$ of a given quantity u of unmet demand d. A reasonable assumption is that $\gamma_d(u) \leq u$. In addition to determining the amount of the demand to be carried from one period to the next, we can specify the priority of the backlogged demand. There are several reasonable approaches to setting the priority of the backlogged demand. Some will be discussed below.

For now we assume that there is a function $\alpha:R \rightarrow R$ that is used to determine the new priority of the backlogged demand from the priority of the demand.

Revised "backlogging" step for Basic Allocation Method

STEP 7': Update $\hat{d}$ as follows:

$$q_{\hat{d}}=q_{\hat{d}}+1,$$

$$v_{\hat{d}}=\gamma_{\hat{d}}(v_{\hat{d}}-v^*),$$

$$h_{\hat{d}}=\alpha(h_{\hat{d}}).$$

If $v=0$ then $D=D-\hat{d}$.

We now describe three specific allocation methods that differ only in the way in which the original demand priorities are set, and in the way in which priorities are updated. We assume that each demand $d \in D$ has associated with it a relative value $\eta_d \geq 0$. All of these methods use full backlogging ($\gamma_d(v)=v$).

Method 1 ("due date, ship date driven"): Let $H \in R$ be such that $H > \eta_d$ for all $d \in D$. Initialize demand priority ha as follows: $h_d=\eta_d+H(T^2-q_dT)$. Update the priority of the backlog from demand d as follows: $\alpha(h_d)=h_d-H$.

When allocating resources, this method gives highest preference to demands with earliest due dates, among demands with the same due date, it gives preference to the demands that can be met soonest, and among demands with the same due date t that can be met in the same period $\tau \geq t$ it gives preference according to the value $\eta_d$.

Method 2 ("Backlog-merge"): Let $H \in R$ be such that $H > \eta_d$ for all $d \in D$. Initialize demand priority $h_d$ as follows: $h_d=\eta_d+H(T-q_d)$. Update the priority of the backlog from demand d as follows: $\alpha(h_d)=h_d-H$.

In this method a demand from period t that is backlogged to period $\tau$ does not necessarily have precedence over the demands with original due date in period $\tau$.

Method 3 (pre-allocation): Initialize demand priority $h_d$ as follows: $h_d=\eta_d$ Update the priority of the backlog from demand d as follows: $\alpha(h_d)=h_d$.

In this method, the due date of a demand plays no role in determining when the demand is considered. Only the demand value $\eta_d$ is considered. The priority of a demand does not increase or decrease as it becomes backlogged.

Equitable Allocation Methods

Each of the above described allocation methods, including the basic method, considers a single demand at a time, according to some priority function. If two demands require a common resource, and that resource is not available in sufficient quantity to meet both demands, then the demand that is considered first will consume as much of the resource as it can use, and the demand that is considered second will be allowed to use only the remaining quantity. This can lead to shipment schedules that meet one demand in full, (or, in the backlogging case, on time) and meet another equal priority demand only in part (or, in the backlogging case, late). Such solutions are not attractive to most production planners, because they give the impression of being unfair or arbitrary in the allocation of resources.

Any of the above methods can be modified to perform a more equitable allocation by simply dividing each initial demand into N>1 separate demands and adjusting the relative priorities or values on the new demands. The number N is selected based on the desired level of equitability.

Equitable Allocation Procedure Let $D=\{d_1, d_2, \ldots, d_n\}$, and let the integer N be given. Select $M \in R$ such that $M>Nn$. Split each demand $d_1$ into N demands $d_{i,1}, d_{i,1}, \ldots, d_{i,N}$ with $p_{d_{i,k}}=p_{d_i}$, $q_{d_{i,k}}=q_{d_i}$, $h_{d_{i,k}}=Mh_{d_i}+n(N-k)+(n-i)$.

If shipments are allowed to be fractional, then evenly divide the demand quantities:

$$v_{d_{i,k}} = v_{d_i}/N$$

Otherwise, compute integer quantities $v_{d_{i,k}}$ as follows:

$$v_{d_{i,1}} = \left\lfloor \frac{1}{m} v_{d_i} \right\rfloor$$

$$v_{d_{i,k}} = \left\lfloor \frac{k}{m} v_{d_i} \right\rfloor - \sum_{l=1}^{k-1} v_{d_{i,1}} \quad \text{for } k=2,3,\ldots,N.$$

Apply the demand driven basic allocation algorithm to the demand set $\overline{D}=\{d_{i,k} | d_i \in D, k=1,2,\ldots,N\}$.

Note that due to the choice of M if $d_i, d_j \in D$ and $h_{d_i} < h_{d_j}$ then for every k, $1 \in \{1,2,\ldots,N\}$ we have $h_{d_{i,k}} < h_{d_{j,l}}$. Also, if $h_{d_i} = h_{d_j}$ and $1 \leq k < l \leq N$ then $h_{d_{i,k}} > h_{d_{j,l}}$. This means that applying the basic algorithm to the set $\overline{D}$ and then summing the shipment variables $s_{d_{i,k},t}$ over k to obtain $s_{d_i,t}$ will result in a feasible solution that allocates equitably among the original demands with highest priority, then nets and allocates equitably among the original demands with second highest priority, and so on, until the remaining material and capacity is allocated equitably among the demands of the lowest priority class. Any of the backlogging methods can be applied to the split demand set $\overline{D}$ to obtain an algorithm that both allocates equitably and backlogs demand.

Figure 5A:
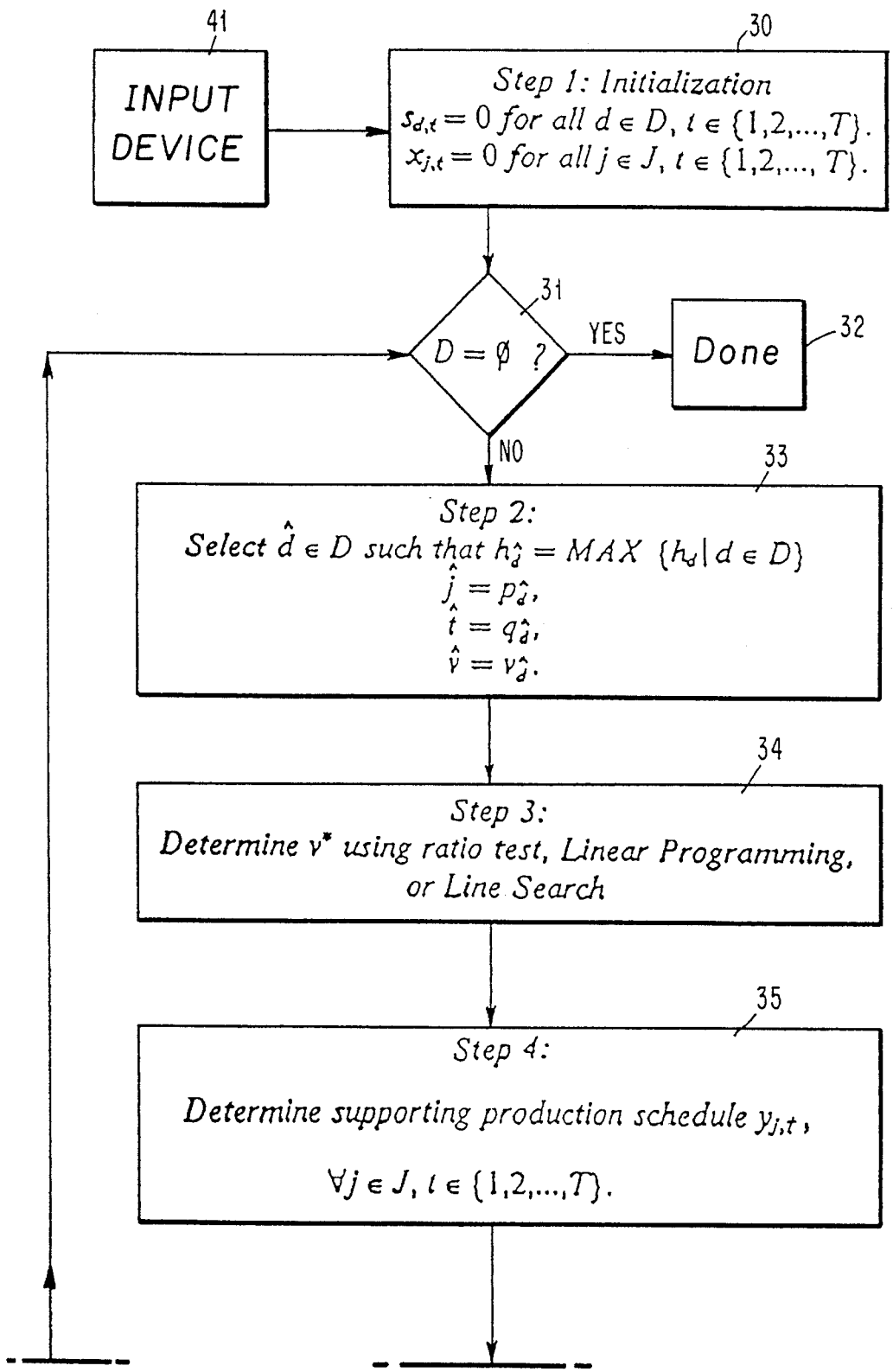
FIG. 5 comprises a Basic Demand Driven Allocation Algorithm in accordance with the present invention.
Figure 5B:
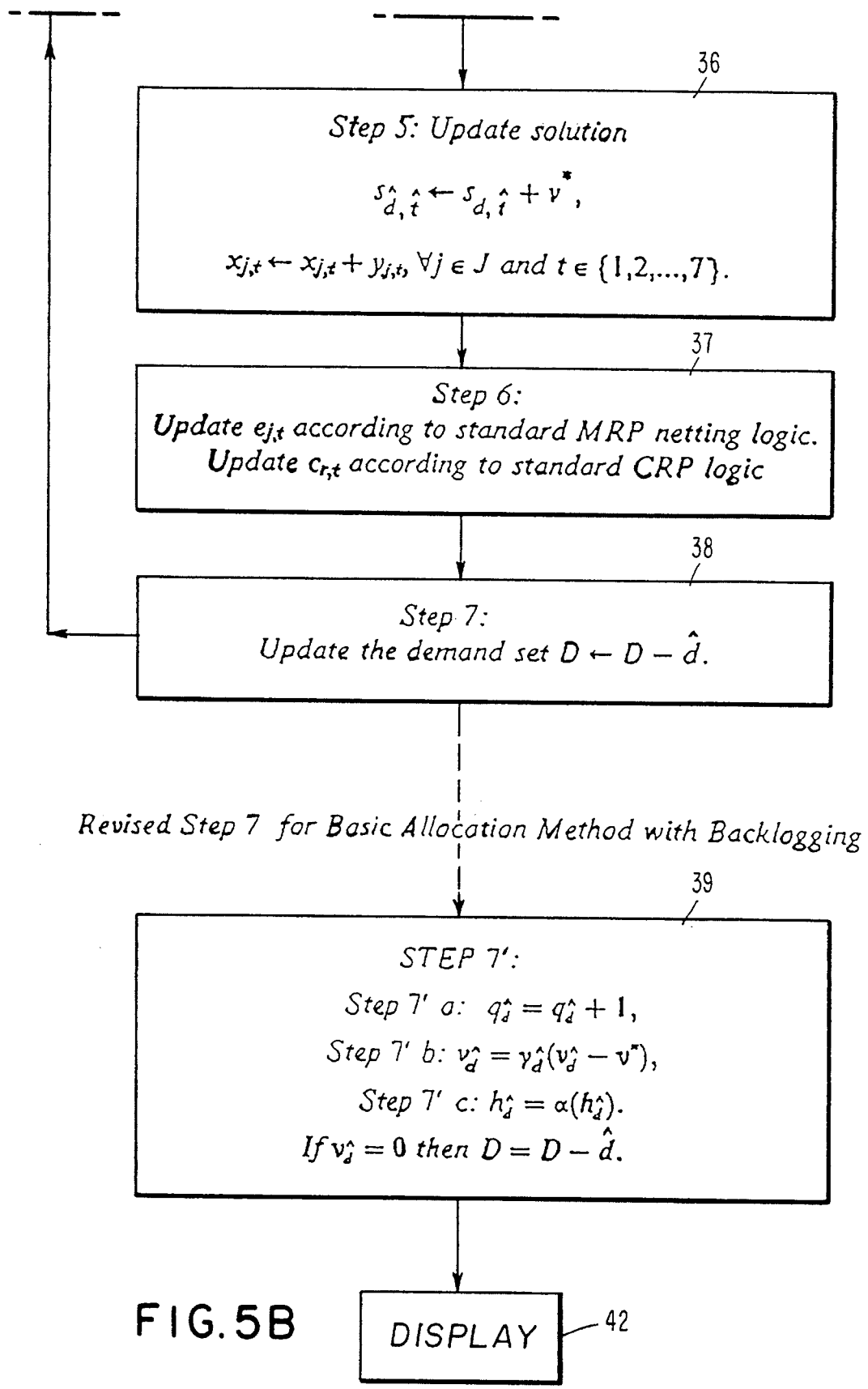

Attention is now returned to FIG. 5, which provides illustration for realization of the novel method by way of machine or computer implementation. In particular, FIG. 5 shows a conventional computer 40 for realizing the Basic Demand Driven Allocation Algorithm. The computer 40 comprises a conventional input device 41 for inputting data comprising requirement, part number supply, resource availability and bill of material resource. Aforementioned boxes 30–39 comprise steps preferably physically implemented in a computer memory means, which memory means accepts data from the input device 41 for ultimate display in a conventional display means 42.

We claim:

1. An allocation method for utilization within a computer for generating a feasible production schedule in response to a specified requirement q, the method comprising the computer implemented steps of:

(1) determining what quantity (r) of a product can be produced with a specified quantity of supply components;

(2) allocating a required quantity of supply components for filling a thus defined partial order; and (3) filling a remainder of the requirement (q-r) at some later time; wherein the steps (1) and (2) and (3) are quantitatively determined by simultaneously solving within the computer a material balance constraint (MBC) inequality and a capacity availability constraint (CAC) inequality, wherein (i) the MBC comprises a step of comparing
      a) a quantity of product for external requirement (over an arbitrary time period) plus a total usage of parts in a production of other parts (over the same arbitrary time period), with
      b) a total external availability of parts (over the arbitrary period) plus a total production of parts lover the arbitrary period); and (ii) the CAC comprises a step of comparing
      a) a total quantity of resource (used in the arbitrary time period) with
      b) an availability of resource (in the arbitrary time period);

so that if there is not sufficient capacity or material available to meet every requirement, the solution allocates available resources in favor of requirements with high priority.

2. A method according to claim 1, comprising the step of quantitatively defining the MBC inequality and the CAC inequality so that the following inequalities obtain:

$$\sum_{t \leq t'} w_{i,t} + \sum_{t \leq t'} \sum_{j \in J} \sum_{\tau} a_{i,j,t,\tau} x_{j,\tau} \leq \sum_{t \leq t'} e_{i,t} + \sum_{t \leq t'} x_{i,t} \quad t' \in \{1,2,\ldots,T\}, i \in J \quad (1)$$

$$\sum_{j \in J} \sum_{\tau} g_{r,j,t,\tau} x_{j,\tau} \leq c_{r,t} \quad t \in \{1,2,\ldots,T\}, r \in R \quad (2)$$

where, $w_{i,t}$ is a decision variable denoting the total quantity of part number P/N i made available to meet requirement in period t;

$a_{i,j,t,\tau}$ is a data element denoting a quantity of P/N i required in a period t to produce one unit of P/N j in period $\tau$;

$x_{j,\tau}$ is a decision variable denoting quantity of P/N j produced in period $t \in \{1,2,\ldots T\}$;

$e_{i,t}$ is a data element denoting an external supply of j in period t;

$x_{i,t}$ is a decision variable denoting a quantity of P/N j produced in period $t \in \{1,2,\ldots T\}$;

$g_{r,j,t,\tau}$ is a data element denoting the quantity of resource r required in period t to produce one unit of P/N j in period $\tau$;

$c_{r,t}$ is a data element denoting the quantity of resource r available in period t.

3. A method according to claim 2, comprising a step of simultaneously solving the MBC and CAC inequalities by:

(1) setting $w_{j,t}=0$ and $x_{j,t}=0$ for all $j \in J$ and $t \in \{1,2,\ldots,T\}$; $\overline{JT}=\{(j \in J, t \in \{1,2,\ldots,T\}) | v_{j,t}>0\}$; and doing while $\overline{JT} \neq \emptyset$;

(2) selecting a pair $(\hat{j}, \hat{t}) \in \overline{JT}$ having a highest priority and setting $\hat{v}=v_{\hat{j},\hat{t}}$;

(3) determining $v^*$ as a minimum of: a requirement quantity $\hat{v}$, and a maximum quantity of P/N $\hat{j}$ that can be made available for external requirements in period $\hat{t}$ subject to the availability of material and capacity;

(4) determining a production schedule $y_{j,t}$ for all $j \in J$ and $t \in \{1,2,\ldots,T\}$ necessary to support the external availability of $v^*$ units of P/N $\hat{j}$ in period $\hat{t}$;

(5) updating a solution $w_{\hat{j},\hat{t}} \leftarrow w_{\hat{j},\hat{t}}+v^*$, $x_{j,t} \leftarrow x_{j,t}+y_{j,t}$ all $j \in J$ and $t \in \{1,2,\ldots,T\}$;

(6) updating material availability $e_{j,t}$ according to standard materials requirement planning netting logic; and capacity availability $c_{r,t}$ according to standard capacity requirements planning logic; and (7) updating a set $\overline{JT}$: $\overline{JT} \leftarrow \overline{JT} - (\hat{j}, \hat{t})$.

4. A method according to claim 3, wherein step (3) comprises determining a maximum amount of product by solving a linear program.

5. A method according to claim 3, wherein step (3) comprises determining a maximum amount of product by computing a ratio test.

6. A method according to claim 3, comprising determining a maximum of product by implementing step (3) as a line search.

7. A method according to claim 1, comprising the step of quantitatively determining the recited limitations by simultaneously solving a material balance constraint (MBC) inequality and a capacity availability constraint (CAC) inequality, wherein
  (i) the MBC comprises a step of comparing
    a) a total part shipment (over an arbitrary time period) plus a total usage of parts in a production of other parts (over the same arbitrary time period), and
    b) a total external availability of parts (over the arbitrary period) plus a total production of parts (over the arbitrary period); and
  (ii) the CAC comprises a step of comparing
    a) a total quantity of resource (used in the arbitrary time period) with
    b) an availability of resource (in the arbitrary time period);
so that if there is not sufficient capacity of material available to meet every demand, the solution allocates available resources in favor of demands with high priority.

8. A method according to claim 7, comprising the step of quantitatively defining the MBC inequality and the CAC inequality so that the following inequalities obtain:

$$\sum_{t \leq t'} \sum_{d \in D, Pd=i} s_{d,t} + \sum_{t \leq t'} \sum_{j \in J} \sum_{\tau} a_{i,j,t,\tau} x_{j,\tau} \leq \sum_{t \leq t'} e_{i,t} + \sum_{t \leq t'} x_{i,t} \quad t' \in \{1,2,\ldots,T\}, i \in J \quad (1)$$

$$\sum_{j \in J} \sum_{\tau} g_{r,j,t,\tau} x_{j,\tau} \leq c_{r,t} \quad t \in \{1,2,\ldots,T\}, r \in R \quad (2)$$

where, $s_{d,t}$ is a decision variable denoting a shipment for demand $d \in D$ in period $t \in \{1,2, \ldots T\}$;

$a_{i,j,t,\tau}$ is a quantity of part number P/N i required in a period t to produce one unit of P/N j in period $\tau$;

$x_{j,\tau}$ is a decision variable denoting a quantity of P/N j produced in period $\tau \in \{1,2, \ldots T\}$;

$e_{i,t}$ is an external supply of j in period t;

$x_{i,t}$ is a decision variable denoting a quantity of P/N i produced in period $t \in \{1,2, \ldots T\}$;

$g_{r,j,t,\tau}$ is a quantity of resource r required in period t to produce one unit of P/N j in period $\tau$;

$c_{r,t}$ is a quantity of resource r available in period t.

9. A method according to claim 8, comprising the steps of simultaneously solving the MBC and CAC inequalities by the steps of:
  (1) setting $S_{d,t}$ for all $d \in D$ and $t \in \{1,2,\ldots T\}$ and setting $x_{j,t}=0$ for all $j \in J$ and $t \in \{1,2,\ldots T\}$;
  (2) selecting a demand $\hat{d} \in D$ having a highest priority;
  (3) determining $v^*$ as a minimum of: the demand quantity $\hat{v}$, and the maximum quantity of P/N $\hat{p}$ that can be completed in period $\hat{t}$ subject to the availability of material and capacity;
  (4) determining a production schedule $y_{j,t}$ for all $j \in J$ and $t \in \{1,2,\ldots T\}$ necessary to support the shipment of v units of P/N $\hat{p}$ in period $\hat{t}$;
  (5) updating a solution $$S_{\hat{d},\hat{t}} \leftarrow S_{\hat{d},\hat{t}} + v^*$$

$$X_{j,t} \leftarrow X_{j,t} + y_{j,t} \text{ all } j \in J \text{ and } t \in \{1,2,\ldots T\};$$

(6) updating material availability $e_{j,t}$ according to standard materials requirement planning netting logic; updating capacity availability $c_{r,t}$ according to standard capacity requirements planning logic; and
  (7) updating a demand set $D \leftarrow D - \hat{d}$.

10. A method according to claim 1, comprising modifying and revising demand specification set D for addressing backlogging and comprising the steps of:
  (1) determining the remaining demand quantity through use of a backlogging function; and
  (2) updating the priority of the demand.

11. A method according to claim 1, comprising a step of performing a more equitable allocation by dividing initial demands and adjusting relative priorities.

12. A method according to claim 11, comprising a step of defining a split demand set for obtaining an algorithm that both allocates equitably and backlogs demand.

* * * * *